Dec. 8, 1942.   H. K. BIGELOW   2,304,530
BRAKE SHOE BURNISHER
Filed Sept. 11, 1940   3 Sheets-Sheet 1
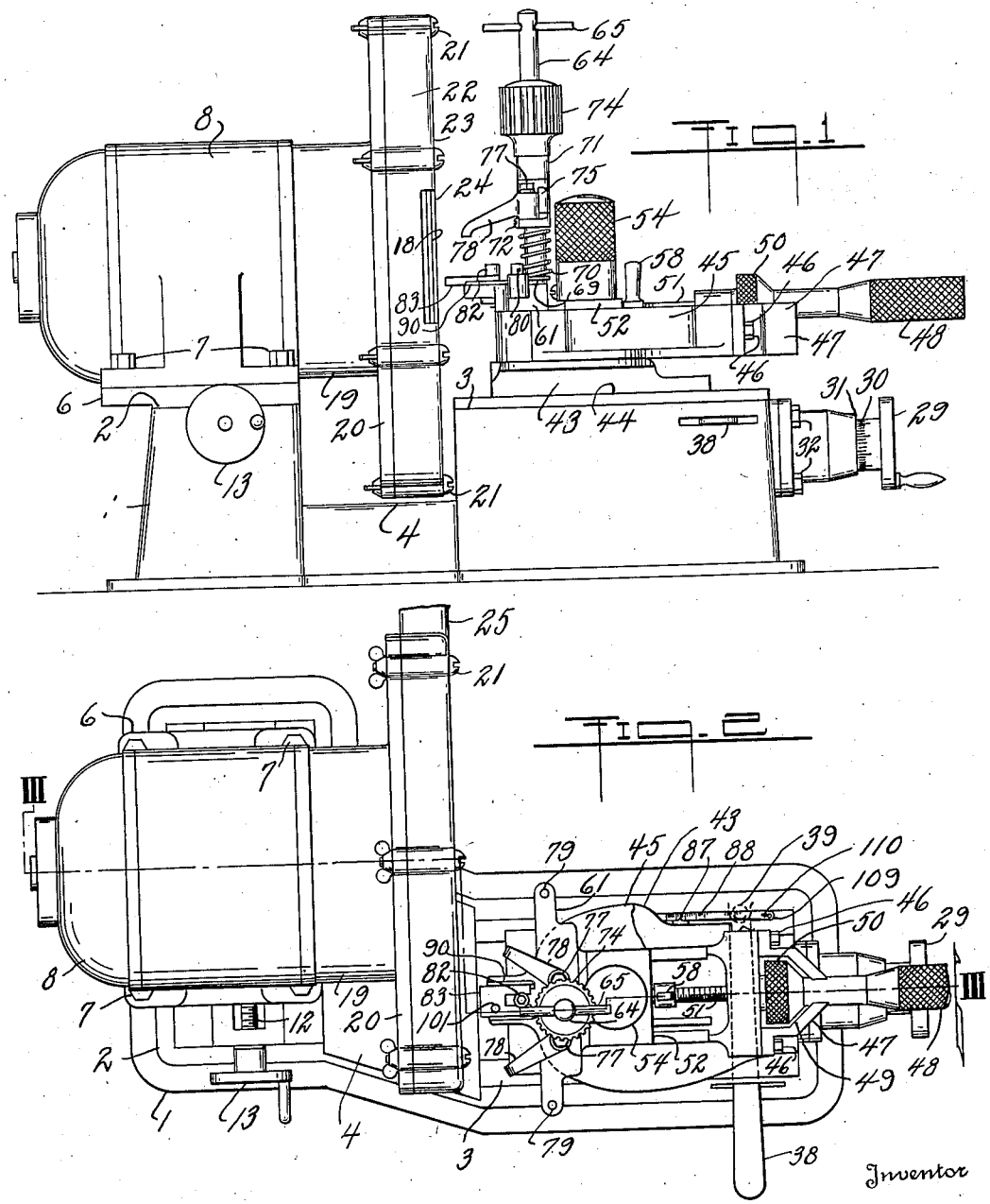
Inventor
Harry K. Bigelow
By
Attorney Dec. 8, 1942.  H. K. BIGELOW  2,304,530
BRAKE SHOE BURNISHER
Filed Sept. 11, 1940   3 Sheets-Sheet 2
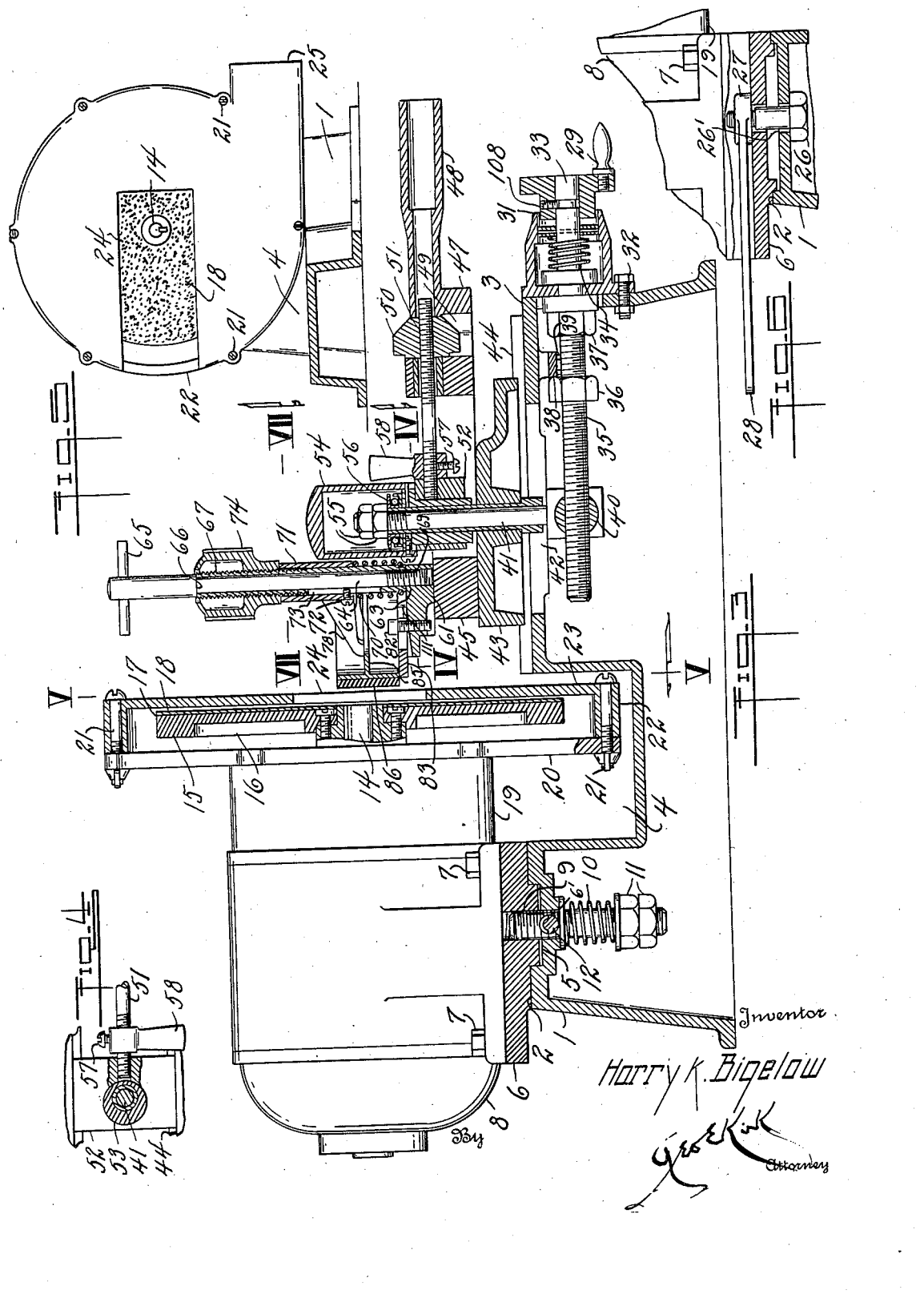
Inventor
Harry K. Bigelow
By
Attorney

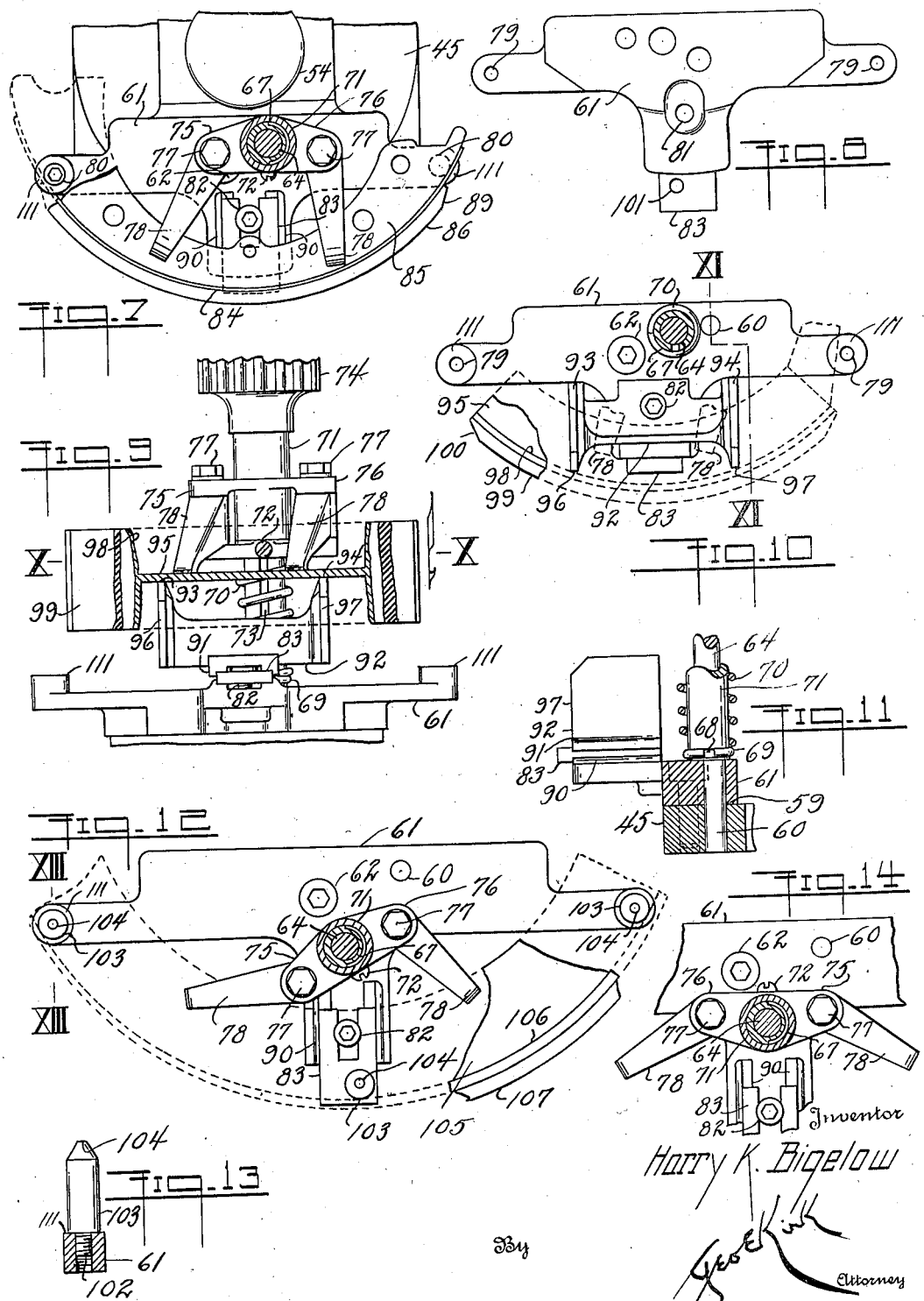

Patented Dec. 8, 1942

2,304,530

UNITED STATES PATENT OFFICE 2,304,530

BRAKE SHOE BURNISHER

Harry K. Bigelow, Columbus, Ohio, assignor of one-half to Benjamin S. Lurie, Columbus, Ohio Application September 11, 1940, Serial No. 356,297

4 Claims. (Cl. 51—124)

This invention relates to equipment flexible for ready adaptation to definite sizes in finishing arc faces as of brake shoes.

This invention has utility in dressing and redressing the friction or gripping faces of brake shoes for motor vehicles.

Referring to the drawings:

Fig. 1 is a side elevation of an embodiment of the invention in a burnisher for the brake shoes of motor vehicles;

Fig. 2 is a plan view of the tool of Fig. 1;

Fig. 3 is a section on the line III—III, Fig. 2, showing the holder assembly on the deck of the base;

Fig. 4 is a partial section on the line IV—IV, Fig. 3, showing the eccentric lock or clamp for the secondary holder on the stem of the primary holder;

Fig. 5 is a view on the line V—V, Fig. 3, showing the window for the abrading disk through which the brake shoe protrudes in adjusting the holder for the operation of this tool;

Fig. 6 is a fragmentary detail view of a quick release mounting for the motor on its deck;

Fig. 7 is a view on the line VII—VII, Fig. 3, showing the holder with the clamping fingers in position for engaging the brake shoe to be serviced;

Fig. 8 is a bottom plan view of the adaptor plate providing the multiple seats for the brake shoe;

Fig. 9 is a view from the abrading disk side looking at the assembly of Fig. 7, wherein there is an additional auxiliary parallel-seat-providing means, more particularly for minor length of arc type of articles or shoes to be treated;

Fig. 10 is a plan view, with parts broken away, for the mounting of the short shoe portion as shown in Fig. 9;

Fig. 11 is a section on the line XI—XI, Fig. 10, showing the anchorage or dowel pin of the mounting seat locating adaptor plate in the secondary holder;

Fig. 12 is a view in plan of the adaptor plate wherein the web of the shoe may be engaged instead of the edge of the arc of the shoe wear supporting face;

Fig. 13 is a section on the line XIII—XIII, Fig. 12, showing one of the seats for terminally engaging the web and against the side of which the arc plate may rest; and Fig. 14 is a detail view of the finger clamp features in which the yoke is reversed as to its sleeve and thereby changing the range of the throw of the fingers as to the sleeve or stem carrier therefor.

Base 1 (Figs. 1, 2, 3) provides first deck 2, second deck 3, and intermediate drop or clearway 4. This deck 2 has a way 5 therein providing for sliding movement of plate 6 anchored through bolts 7 with motor 8. Extending into this plate 6 is screw stem 9 which extends through the deck 2 and has thereon compression spring 10 and nuts 11. In tapped engagement with the screw 9 is a threaded stem 12 which has protruding from the base 1 a hand wheel 13 thereon rotatable to shift the motor 8 on the deck 2. In this shifting, the stem 9 travels along the slot 6'. The motor 8 has a shaft 14 upon which is mounted disk 15 having on its side toward the motor, fan blades 16, and on the side away from the motor cement 17 to attach an abrasive face 18. Fixed with the housing of the motor is section 19 carrying a disk 20 adapted to receive bolts 21 mounting a cylindrical portion 22 and disk front 23, thus providing with the disk 20 a housing for the abrading disk, in which housing there is radial window 24 (Fig. 5). The direction of extent of this window 24 is parallel to the direction of shifting of the motor 8 in the guide-way 5. This housing is a dust collector having suction intake at the window 24 with discharge therefrom by way 25.

In lieu of the hand wheel adjustment 13 for shifting the motor 7, thereby providing a different region of contact for arc shaped work protruding into the window 24, a quick release device may be provided. Bolt 26 (Fig. 6) from the base 1 at the region of the deck 2 protrudes from slot 26', through the plate 6 and is there engaged by nut 27 on arm 28 extending accessibly clear of the deck 2 and the motor 8. Accordingly, the operator by swinging this arm 28 counterclockwise as to the bolt 26 releases the clamping action between the bolt 26 and the nut 27, thereby to permit shifting of the motor 8 on the deck 2 and transversely of the extent of the deck 3 toward the window 24.

The deck 3, remote from the motor 8, is provided (Figs. 1, 2, 3) with hand wheel 29 having graduations 30 for accurate adjustment of a pointer on a complementary indicator 31 fixed by a bolt 32 with the base 1. From this hand wheel 29 there extends shaft 33 into the base 1 through the indicator 31 housing a compression spring 34. This shaft 33 has a threaded portion 35 in the base 1 with nuts 36, 37, between which may extend arm 38 having pivot mounting 39. This is a quick adjustment for axial shifting of this shaft 33 against the resistance of the compression spring 34. On this threaded portion 35, remote from the hand wheel 29, is a nut 40 providing mounting for an upstanding stem 41 extending through a slot 42 in the deck 3. On this stem 41 is a primary holder 43 coacting with guides 44 in the deck 3 parallel to the slot 42 and the shaft 14. On this primary holder 43 is a secondary holder 45. Bolts 46 mount an extension 47 therewith to anchor a radially extending handle 48. This extension 47 provides a clearance 49 in which is a knurled nut 50 on a stem 51 extending radially of this swingable secondary holder 45 to engage a collar 52, through which extends an eccentric 53 on this stem 41. Fixed with this eccentric 53 is a handle cap 54 housing lock nuts 55 which have an antifriction bearing 56 holding with the stem 41. On this stem 51 anchored by a set screw 57 is a wing 58. This means that independently of the threaded nut 50 this wing 58 may angularly shift the stem 51 and thus bring this stem 51 into released position on the eccentric 53. The released cap 54 may be rotated to determine the different axial point for the secondary holder 45. With this point determined, the wing 58 may be again shifted and thereby lock the stem 51 with the eccentric. Thereafter, rotation of the nut 50 is a definite shift for varying the radius length instead of the position of the axis. This means the swinging of the handle 48 may be on its common arc for a greater or less extent arc in the operation of the secondary holder 45.

In this secondary holder 45 is an opening 59 (Fig. 11) carrying a dowel pin 60 to locate a seat-providing holder or adaptor plate 61 supplementally anchored therewith (Fig. 14) by a screw 62. These two points thereby positively fix the position of this multi-seat-providing member 61 on the secondary holder 45. This adaptor plate 61 has a threaded opening 63 (Fig. 3) directly engaged by a stem 64 having a handle 65 and thereby providing a direct anchorage quickly operable for holding or release. This stem 64 has a shoulder 66 for abutting a sleeve 67. Remote from this collar 66, the sleeve 67 has a groove 68 (Fig. 11) in which may be placed a split ring 69 to hold a compression helical spring 70 against getting clear of assembly on this sleeve 67 and against a secondary sleeve 71 (Fig. 3). This secondary sleeve 71 has a set screw 72 therefrom extending into a spline way 73 of the sleeve 67. There is thus a holding of this secondary sleeve 71 from rotation relatively to the sleeve 67. This means that a nut 74 coacting with the threaded portions of the sleeve 67 may effect compression of the spring 70 in thrusting this secondary sleeve 71 toward the adaptor plate 61. This secondary sleeve 71 or yoke has arms 75, 76 (Fig. 7) which, in their connection relation between bolts 77 to their termini, are offset but slightly centrally from the stem 64. These bolts or pivot pins 77 mount swinging secondary arms or fingers 78.

The plate 61 may have terminal openings 79 (Fig. 8) in which may be mounted abutments 80 (Fig. 7). An intermediate opening 81 may be engaged by an abutment providing holding screw 82 serving to mount a U-shaped member or tongue 83 to be thus clamped and provide a protruding seat or rest, desirably to its free portion to protrude just to engage under an arc-shaped intermediate portion 84 having a web 85 and upon which may be placed a brake shoe face 86. At this position of setting, the brake shoe is to have the arc portion 84 rest on the free end of the tongue 83 with such tongue desirably not to protrude under the face 86. It is in order to have the inner side of this arc portion 84, remote from the mid supported portion of the arc adjacent the tongue 83, just to abut the abutments 80 at the inner side of the arc portion with the edge of the arc portion in alignment with the upper face of the tongue 83 to be also supported. There is thus multiple seat-providing means for the brake shoe, and opposing these under supporting seats for the brake shoe are the free ends of the clamp fingers 78 located away from directly opposing the seats of the adaptor plate, that is, one of the fingers 78 is between the tongue 83 and an abutment 80 and the other finger 78 is between the tongue 83 and the remote or other abutment 80. This means there is a stable anchorage for this brake shoe.

In such position the operator, according to the gage for such shoe, determines placement of the primary holder 43 (Fig. 2) with its pointer 87 at graduations 88 carried by the deck 3. It is desirable that the complementary indicator 31 have the graduations 30 show zero. Before starting the dressing operations, appropriately the handle 48 may be swung to the limit of a position and then through the operation of the handle 38 termini 89 (Fig. 7) of the brake shoe face 86 may be thrust against the abrading face 18 of the abrading disk and thus be beveled or skived off. This leaves the intermediate portion of the brake shoe face 86 for attention. The handle 38 is then released and the spring 34 thus clears the shoe from the abrading disk 18. The handle 48 may then be swung to rock the secondary holder 45 on this stem 41 desirably for contacting the brake shoe face 86 for dressing a full way thereacross but a minimum in a cutting thereinto, thereby to establish the appropriate working arc for an accurate full gripping in the brake drum as in service. As there may be occasion for a holding or approaching such an arc face with accuracy, such involves the supplemental adjustment through a release of the cap 54 and a setting of the eccentric 53, and thereafter a locking through the arm 58. This adjustment is to take care of what may seem to be an unevenness. Should the approach be seemingly without or not within the range for a burnishing contact and symmetrically away from such range, there is an adjustment not of this eccentric through the cap 54 but of the stem 51 through the operation of the nut 50.

With this tool accurately set for one of the shoes and such shoe dressed, or redressed if it be a secondary or replacement shoe, it is only necessary for the operator to use the handle portion 65 in releasing the stem 64 from its anchorage with the plate 61. This forthwith releases the adjustable fingers 78 and the shoe may be released and a substitute shoe placed for a repetition of this cycle of operation.

Besides these normal brake shoes or service shoes, in some instances there are less arc extent portions even adapted to be used with the regular brake shoes and termed "emergency." In the range of functioning hereunder this may be given attention independently of the abutments 80. The tongue 83 in its adjustment as to the adaptor plate 61 is controlled by guides 90 (Fig. 7) provided by the plate 61. The shoulder-providing clamping screen 82, while mounting the tongue 83, may have the upper side of this tongue 83 cooperate with guides 91 in a supplemental device 92 (Figs. 9, 10), wherein a pair of seats 93, 94, form top rests to engage the lower side of a web 95 of the short shoe, and with abutting portions 96, 97, to engage the inner side 98 of this shoe having the web 95 and having a wear face 99. In the dressing of this shoe, its skive termini 100 are first given attention and then the intermediate portion checked up with the shoe having the face 86. However, in the placing of this short shoe to have a plurality of supports and a plurality of abutting portions, between such supports 93, 94, the clamping fingers 78 are brought into holding action. Here in the instance with the shoe having the face 86, there may be quick release through the handle 65 and the companion similar type shoe quickly set at the adjusted positions determined by the clamp nut 74 for the respective fingers 78. In this set-up with the short shoe it is desirable to have the tongue 83 protrude just short of supporting the metal wall 98. This means that the support of this shoe is through the web portion 95 resting on the seats 93, 94.

Web support and abutment in a plurality of places for a brake shoe, even not the short arc type requiring the device 92, may be had. In such instances, instead of this tongue 83 providing the support for the device 92, there is mounted in an opening 101 (Fig. 8) of the tongue 83 (Fig. 12) a threaded portion 102 (Fig. 13) of an abutment 103 having a rest terminus 104. In the respective openings 79 of the adaptor plate 61, in lieu of the abutments 80, there may be placed these abutments 103 having the termini 104. Accordingly, a brake shoe having a web 105 may have such web rest on the termini 104 with the cylindrical sides of these abutments 103 against the inner side of an arc portion 106 of this brake shoe having a brake shoe face 107. In the set-up herein, the abutments 103 in the seats 79 are contacted as to the portions 106 while the portions 104 engage the web 105. With these portions 103 in contact with the arc portions 106, the intermediate portion or abutment 103 is positioned with the tongue 83 to just contact the arc portion 106. There is accordingly assured the multiple seat-providing contacts and the fingers 78 are placed intermediate these contacts in effecting clamping engagements for stability in the functioning of the tool hereunder. In the range of sizes the fact that, between the pivot screws 77 in the arms 75, 76, for this yoke such is off center from the supporting stem 64, means that when such may be rocked (Fig. 12) to give a range of placement, and even reversed (Fig. 14) for further shorter range than that of the common longer range of Fig. 7.

In the carrying out of the invention herein, the operator preliminarily determines the nicety of adjustment in the machine, say by gage of standard means to the end that the machine will function with the parts at zero for the graduations at the hand wheel 29 or supplementally adjusted by a set screw 108 (Fig. 3). In the event the standard determination for the pointer 87 does not conform to the graduations on the scale 88, screws 109 may be slacked off and the scale carrying member 88 shifted in the slots 110 (Fig. 2). With this accuracy determined for the functioning of the tool, a brake shoe may be located in the simple form hereunder to have its arc portion 84 (Fig. 7) rest on the tongue 83, with such tongue not protruding into the fabric of the brake face portion 86. The terminal portions from this mid-portion of the shoe are engaged by the tongue 84 to be against the sides of the abutments 80 and rest on the plate at the shoulders 111 (Fig. 9) provided by this plate 61 in the common plane with the upper side of this tongue 83. The fingers 78 as brought into clamping position in the manipulation of the nut 74 determine an effective clamping set-up. The positioning is desirably preliminarily one for terminal skiving of the shoe and thereafter adjustment of the radial distance, if the shoe be a little bit away from the normal size, which is overcome by the adjustment of the nut 50, while if the matter be centralizing or determining slight off-center position, such is effected by the adjustment of the eccentric 53. The terminations for minimum of accurate burnishing of the face 86 are then effected with the motor 80 operated to rotate the abrading disk and the handle 48 swung backward and forward to effect transit of the brake shoe face 86 protruding through the window 24 to be acted upon by the abrading disk. In order that this action may not be local to a certain or fixed radial distance of the abrading disk, the wearing down of the disk may be distributed throughout its radial extent by shifting the motor and abrading disk on the motor supporting deck.

This application is a continuation-in-part of my copending application Ser. No. 272,451, filed May 8, 1939, Brake shoe dressers.

What is claimed and it is desired to secure by Letters Patent is:

1. In a brake shoe dressing tool, an adaptor plate, three stop means therealong, the intermediate one of which is adjustable in adapting the plate to different radii arcs of shoes, each of which stop means includes a plurality of seats for a brake shoe, a plurality of adjustable clamp finger means adapted to oppose and be positioned independently of said seats, and a control for simultaneously throwing the finger means into and out of clamping relation.

2. In a brake shoe dressing tool, an adaptor plate, three stop means therealong including a radially adjustable intermediate tongue providing a rest, an abutment thereby adapting the plate to different radius arcs, each with three seats spaced therealong.

3. In a brake shoe dressing tool, an adaptor plate, stop means therewith including a pair of spaced terminal rests each providing an abutment, an intermediate relatively adjustable stop, thereby providing three seat portions for conforming to an arc of a particular shoe.

4. In a brake shoe device embodying a holder, a clamp device opposing the holder and embodying a swingable yoke, a plurality of relative swingable fingers mounted on the yoke, a stem directly anchored with the holder, a sleeve on the stem, a spring on the sleeve for engaging the yoke, and a nut for releasing the yoke for angular shifting on the stem to thereby shift the fingers, and a control for simultaneously throwing the fingers toward and from the holder.

HARRY K. BIGELOW.